United States Patent
Hayakawa et al.

(10) Patent No.: US 12,447,991 B2
(45) Date of Patent: Oct. 21, 2025

(54) VEHICLE LANE CHANGE CONTROL METHOD AND VEHICLE LANE CHANGE CONTROL DEVICE

(71) Applicant: Nissan Motor Co., Ltd., Yokohama (JP)

(72) Inventors: Yasuhisa Hayakawa, Kanagawa (JP); Fuminori Takeda, Kanagawa (JP); Yoshiya Kusatomi, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 232 days.

(21) Appl. No.: 17/780,556

(22) PCT Filed: Dec. 10, 2019

(86) PCT No.: PCT/JP2019/048284
§ 371 (c)(1),
(2) Date: May 27, 2022

(87) PCT Pub. No.: WO2021/117132
PCT Pub. Date: Jun. 17, 2021

(65) Prior Publication Data
US 2023/0347926 A1 Nov. 2, 2023

(51) Int. Cl.
*G01C 22/00* (2006.01)
*B60W 30/14* (2006.01)
(Continued)

(52) U.S. Cl.
CPC ........ *B60W 60/001* (2020.02); *B60W 30/143* (2013.01); *B60W 30/18163* (2013.01);
(Continued)

(58) Field of Classification Search
CPC ............. B60W 60/001; B60W 30/143; B60W 30/18163; B60W 30/182; B60W 2554/80; B60W 2720/00; G08G 1/052; G08G 1/167
See application file for complete search history.

(56) References Cited

U.S. PATENT DOCUMENTS 9,475,491 B1 * 10/2016 Nagasaka ............. B60W 30/16
2019/0291642 A1    9/2019 Chae et al.
(Continued)

FOREIGN PATENT DOCUMENTS

DE    10 2017 219 813 A1    5/2019
EP        3 552 899 A1    10/2019
(Continued)

OTHER PUBLICATIONS

Chinese Office Action of Dec. 11, 2024 of corresponding Chinese Patent Application No. 201980102921.X.

*Primary Examiner* — Adam M Alharbi
(74) *Attorney, Agent, or Firm* — GLOBAL IP COUNSELORS, LLP

(57) ABSTRACT

A driving control method is performed to execute a lane-change control for controlling a host vehicle to autonomously change lanes from a first lane to an adjacent second lane using a processor of a driving control device that controls vehicle speed and steering of the host vehicle traveling in the first lane in an autonomous driving mode. The processor determines that the lane-change control can be executed upon determining that the other vehicle has been detected in a detection zone of the second lane, based on a detection result of a sensor. The processor determines that the lane-change control cannot be executed upon determining that the other has not been detected within the detection zone of the second lane. The processor outputs (Continued)

information regarding whether the lane-change control can be executed.

17 Claims, 8 Drawing Sheets

(51) Int. Cl.
*B60W 30/18* (2012.01)
*B60W 30/182* (2020.01)
*B60W 60/00* (2020.01)
*G08G 1/052* (2006.01)
*G08G 1/16* (2006.01)

(52) U.S. Cl.
CPC ........... *B60W 30/182* (2013.01); *G08G 1/052* (2013.01); *G08G 1/167* (2013.01); *B60W 2554/80* (2020.02); *B60W 2720/00* (2013.01)

(56) References Cited

U.S. PATENT DOCUMENTS

| | | | |
|---|---|---|---|
| 2019/0308627 A1 | 10/2019 | Fukuda | |
| 2020/0286387 A1* | 9/2020 | Zhou | G08G 1/0175 |
| 2020/0290618 A1* | 9/2020 | Conrad | B60W 30/162 |
| 2020/0324760 A1* | 10/2020 | Lee | B60W 30/18163 |

FOREIGN PATENT DOCUMENTS

| | | |
|---|---|---|
| JP | 11-250396 A | 9/1999 |
| JP | 2017-133893 A | 8/2017 |
| JP | 2019-107996 A | 7/2019 |
| WO | 2018/012674 A1 | 1/2018 |
| WO | 2019/142284 A1 | 7/2019 |

* cited by examiner

VEHICLE LANE CHANGE CONTROL METHOD AND VEHICLE LANE CHANGE CONTROL DEVICE

CROSS-REFERENCE TO RELATED APPLICATIONS

This application is a U.S. national stage application of International Application No. PCT/JP2019/048284, filed on Dec. 10, 2019.

BACKGROUND

Technical Field

The present invention relates to a driving control method and a driving control device.

Background Information

Japanese Laid-Open Patent Application No. 2017-133893 (Patent Document 1) discloses a notification control device that notifies a driver of the possibility of a transfer of a control right related to the driving operation from an autonomous driving function to the driver. In this notification control device, if the degree of congestion of a zone into which a lane change (LC) is planned is low, the probability that the control right will be transferred to the driver is determined to be relatively low.

SUMMARY

However, Patent Document 1 does not take into consideration that when the degree of congestion of a zone into which a lane change is planned is low and the flow of traffic is smooth, there is a possibility that another vehicle approaching this zone at high speed will suddenly appear near the host vehicle.

The problem to be solved by the present invention is to control the host vehicle to autonomously change lanes in situations in which it is unlikely that another vehicle approaching from behind will suddenly enter the zone into which the host vehicle is planning to change lanes.

The driving control method and driving control device according to the present invention solves the problem described above in that when it is determined that another vehicle is traveling within a prescribed detection zone of the lane into which the host vehicle changes lanes, a determination is made that it is possible to execute lane-change control for causing the host vehicle autonomously to change lanes.

By the present invention, since whether lane-change control of a host vehicle can be carried out is determined in accordance with the detection result of another vehicle that is traveling in a lane designated for lane changing, it is possible to control the host vehicle to change lanes autonomously in situations in which it is unlikely that another vehicle approaching from behind will suddenly enter the lane-change zone the host vehicle plans to enter.

BRIEF DESCRIPTION OF THE DRAWINGS

Referring now to the attached drawings which form a part of this original disclosure.

DETAILED DESCRIPTION OF EMBODIMENTS

Embodiments of the present invention will be described below with reference to the drawings.

First Embodiment

Figure 1:
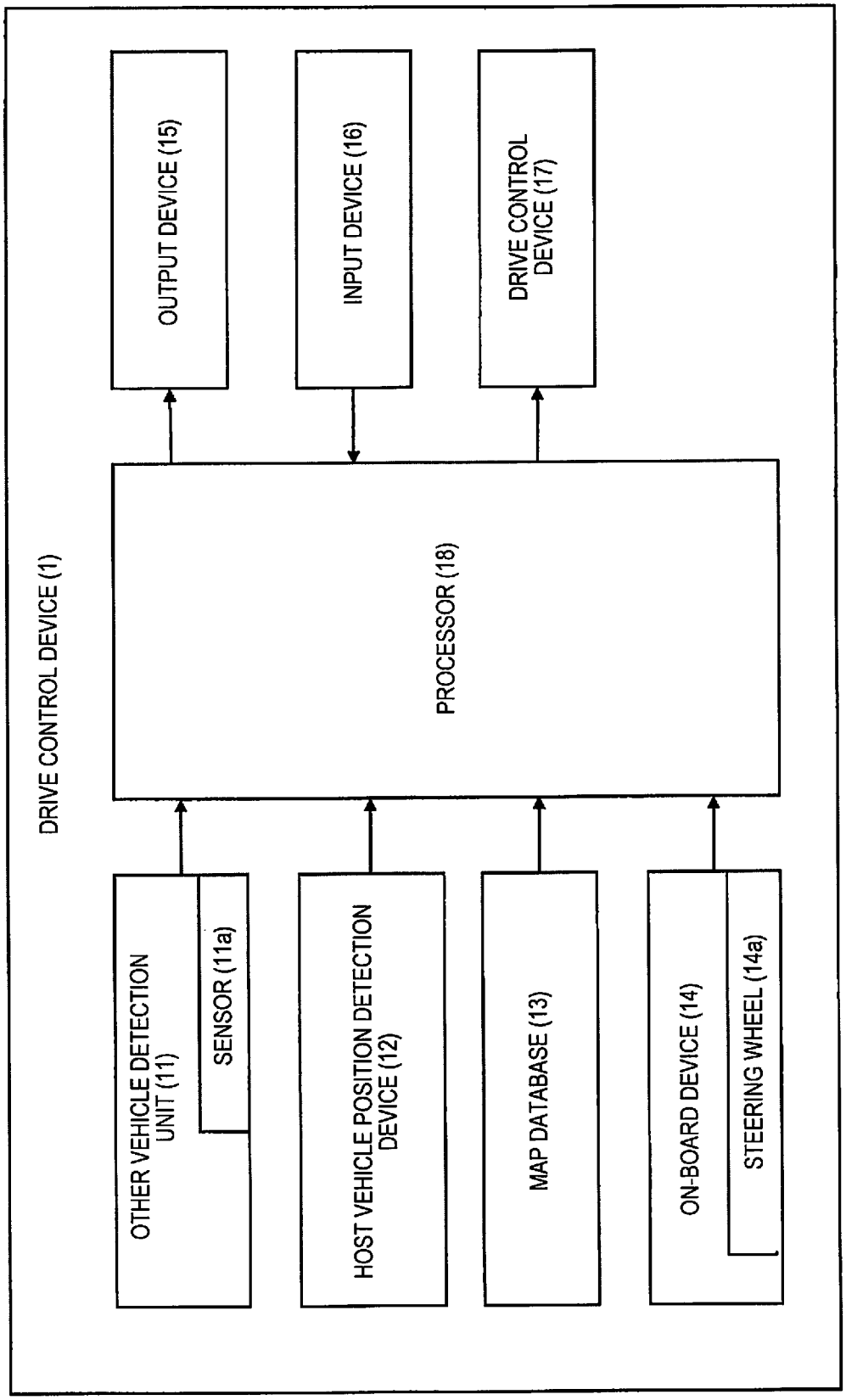
FIG. 1 is a block diagram illustrating a configuration of the driving control device according to a first embodiment of the present invention.

The first embodiment will be described with reference to FIGS. 1-4. FIG. 1 is a block diagram illustrating the configuration of a driving control device 1 according to the present embodiment. The driving control device 1 according to the present embodiment is also one embodiment for executing the driving control method according to the present invention. As shown in FIG. 1, the driving control device 1 of a vehicle according to the present embodiment comprises an other vehicle detection unit 11, a host vehicle position detection device 12, a map database 13, on-board devices 14, an output device 15, an input device 16, a drive controller 17, and a processor 18. These devices are connected, for example, to a CAN (Controller Area Network) and other on-board LANs to mutually send and receive information.

The other vehicle detection unit 11 is provided with a sensor 11a for detecting other vehicles traveling in the vicinity of the host vehicle. The sensor 11a may be a sensor group composed of a plurality of various sensors. The sensor 11a is mounted on a host vehicle. The other vehicle detection unit 11 uses the sensor 11a to detect other vehicles traveling in the vicinity of the host vehicle. The other vehicle detection unit 11 sends detection results to the processor 18. Examples of other vehicles that the other vehicle detection unit 11 can detect using the sensor 11a include preceding vehicles and trailing vehicles traveling in the same lane as the travel lane of the host vehicle, other vehicles traveling in lanes adjacent to the travel lane of the host vehicle, and vehicles moving toward the host vehicle. The other vehicle detection unit 11 includes, as the sensor 11a, at least one of a front camera, a side camera, a rear camera, a front radar, a side radar, and a rear radar. The other vehicle detection unit 11 thus uses the sensor 11a to detect another vehicle traveling in a second lane that is not the first lane, i.e., the lane in which the host vehicle is traveling. Further, the sensor 11a of the other vehicle detection unit 11 has a vehicle-to-vehicle communication system and can acquire vehicle speed information and position information of another vehicle by using vehicle-to-vehicle communication with the other vehicle. Further, the other vehicle detection unit 11 has a road-to-vehicle communication system with a traffic management system external to the vehicle, which includes roadside devices, and the sensor 11a can acquire vehicle speed information and position information of another vehicle by using communication with the traffic management system external to the vehicle. The traffic management system includes Japan's ITS: Intelligent Transport System (Intelligent Transport System). The second lane in the present embodiment includes not only adjacent lanes that are adjacent to the first lane in which the host vehicle is traveling but also adjacent-adjacent lanes, which are adjacent to these adjacent lanes. Further, the range of the second lane is not limited in this way and includes a lane that is adjacent to the first lane and in the same direction of travel. The other vehicle detection unit 11 sets the range of the lanes in which to detect other vehicles in accordance with the number of lanes that are on the road on which the host vehicle travels, the number of lanes that affect the travel of the host vehicle, and the number of lanes in which the host vehicle can travel.

The host vehicle position detection device 12 is composed of a GPS unit, a gyro sensor, a vehicle speed sensor, and the like. The host vehicle position detection device 12 detects radio waves transmitted from a plurality of satellite communications by using the GPS unit, and periodically acquires position information of the target vehicle (host vehicle). The host vehicle position detection device 12 detects the current location of the target vehicle based on the acquired position information of the target vehicle, angle change information acquired from the gyro sensor, and vehicle speed acquired from the vehicle speed sensor. The position information of the target vehicle detected by the host vehicle position detection device 12 is output to the processor 18 at prescribed time intervals.

The map database 13 is memory for the storage of high-precision three-dimensional map information that includes location information concerning various facilities and specific points and that is configured to be capable of being accessed from the processor 18. The map database 13 stores high-precision digital map information (high-precision map, dynamic map). In the present example, the stored high-precision map information is three-dimensional map information that includes ride height information detected by using a data acquisition vehicle traveling over actual roads. The high-precision map information includes identifying information of numerous lanes on roads. The map information of the map database 13 includes three-dimensional location information pertaining to highways and/or curved lane roads, as well as the size of curves (for example the curvature or the radius of curvature), the locations of merge points, branch points, and lane reduction locations. The high-precision map information also includes information relating to facilities, such as service areas and parking areas.

The on-board devices 14 are mounted in the vehicle and function in response to operations performed by an occupant. The on-board devices 14 include a steering wheel 14a. Further, examples of other on-board devices 14 include an accelerator pedal, brake pedal, navigation device, turn signal indicator, wipers, lights, horn, and other specific switches. When the occupant operates the on-board devices 14, the information is output to the processor 18. The processor 18 outputs control commands based on the operation information to the drive controller 17. The drive controller 17 drives a drive device of the vehicle in accordance with the control command. The occupant that operates the on-board devices 14 is primarily the driver, but an occupant other than the driver can also operate the on-board devices 14.

The output device 15 includes a display provided in a navigation device, a display incorporated in a rearview mirror, a display incorporated in a meter unit, a head-up display projected onto a windshield, a loudspeaker provided in an audio device, a seat device in which a vibrating body is embedded. The output device 15 notifies the driver and other occupants of lane-change information and presentation information, described further below, in accordance with the control of the processor 18.

The input device 16 is, for example, a touch panel display on which a button switch is displayed with which an occupant's manual operation can be input, or a microphone with which the driver's voice can be input. The touch panel type display functions as the output device 15 as well as the input device 16. Further, the occupant that inputs instructions to the input device 16 is primarily the driver, but an occupant other than the driver can inputs instructions to the input device 16.

The drive controller 17 controls the operation of the host vehicle. For example, the drive controller 17 controls the braking operation as well as the operation of a drive mechanism for adjusting the acceleration/deceleration and the vehicle speed (including the operation of an internal combustion engine in a vehicle with an engine and the operation of a travel motor in an electric vehicle system, and including torque distribution between an internal combustion engine and a travel motor in a hybrid vehicle) by using an autonomous speed control function. Further, the drive controller 17 controls the operation of a steering actuator by using an autonomous steering control function, thereby executing steering control of the host vehicle. For example, the drive controller 17 detects lane markers of the lane in which the host vehicle travels and controls the travel position (lateral position) of the host vehicle in the widthwise direction, so that the host vehicle travels in the center of the lane. Further, the drive controller 17 controls the changes in the direction of travel, the overtaking of a vehicle traveling ahead of the host vehicle, and the like. Further, the drive controller 17 carries out travel control for turning left or right at an intersection, or the like. Further, other known methods may be used as the travel control method carried out by the drive controller 17.

The processor 18 includes a ROM (Read-Only Memory) for storing a program for controlling the operations of the host vehicle, a CPU (Central Processing Unit) that executes the program stored in this ROM, and a RAM (Random-Access Memory) that functions as an accessible storage device. In terms of the operating circuit, an MPU (Micro Processing Unit), a DSP (Digital Signal Processor), an ASIC (Application-Specific Integrated Circuit), a FPGA (Field Programmable Gate Array), etc., may be used in place of, or in addition to, the CPU (Central Processing Unit).

The processor 18 acquires travel information relating to the travel state of the host vehicle. For example, the processor 18 acquires, as travel information, image information external to the vehicle captured by a front camera, as well as a rear camera, and detection results of a front radar, a rear radar, and side radars. Further, the processor 18 also acquires, as travel information, vehicle speed information about the host vehicle detected by the vehicle speed sensor and image information of the driver's face captured by an on-board camera.

Further, the processor 18 acquires, as travel information from the host vehicle position detection device 12, information about the current location of the host vehicle. Further, the processor 18 acquires, as travel information from the map database 13, location information, such as curved roads and the size of curves (for example, the curvature or the radius of curvature) merge points, branch points, toll booths, lane reduction locations, service areas (SA)/parking areas (PA), and the like. Further, the processor 18 acquires, as travel information from the on-board devices 14, information regarding occupant operation of the on-board devices 14. Further, the processor 18 acquires detection results regarding other vehicles in the vicinity of the host vehicle from the other vehicle detection unit 11.

Further, the processor 18 executes a program stored in the ROM by using the CPU, thereby autonomously controlling the vehicle speed and the steering of the host vehicle by using the autonomous travel control function. The processor 18 transmits control instructions based on the autonomous travel control function to the drive controller 17.

The processor 18 can set an autonomous driving mode in accordance with the driving assistance level, and assist the travel of the host vehicle in accordance with the set driving mode. The driving assistance level indicates the degree to which the driving control device 1 assists the driving of the vehicle by the autonomous travel control function. The driver's contribution to the driving of the vehicle decreases as the driving assistance level increases. Specifically, the driving assistance level can be set using the definition, etc., based on SAE J3016 of the US Society of Automotive Engineers (SAE). In driving assistance level 0, all of the driving operations of the host vehicle are carried out manually by the driver. In driving assistance level 1, although the driving operations of the host vehicle are primarily carried out by means manual driver operations, the drive controller 17 appropriately supports the manual operations of the driver by using any of the functions, such as automatic braking, following, lane-keeping, etc. In driving assistance level 2, although the driving operations of the host vehicle are primarily carried out by using manual driver operations, under specific conditions, the drive controller 17 can combine a plurality of functions from among the automatic brake function, following function, lane-keeping function, etc., thereby executing the driving assistance operation. In driving assistance level 3, the drive controller 17 executes all of the driving tasks, but the driver must resume control and be prepared to drive manually when requested by the driving control device 1. In driving assistance level 4, under specific conditions, manual driving by the driver is not required, and the processor 18 can control the drive controller 17 to execute all of the driving tasks and monitor the surrounding conditions of the host vehicle. In driving assistance level 5, the processor 18 can control the drive controller 17 to execute all of the driving tasks under all conditions. The classification of these driving assistance levels is not limited to the classification scheme according to the definitions of the US Society of Automotive Engineers, and may be defined based on ISO/TC204 of the International Organization for Standardization (ISO). Further, the classification of the driving assistance levels may be defined by other criteria.

Driving modes with driving assistance levels 0 to 1 will be referred to as "manual driving modes." Driving modes with driving assistance levels 2 to 5 will be referred to as "autonomous driving mode." The processor 18 can switch between a manual driving mode and an autonomous driving mode in accordance with instructions from the driver or the travel conditions surrounding the host vehicle.

Further, although not particularly limited the driving control device 1 of the present embodiment controls the drive controller 17 to execute an autonomous driving function that can switch the autonomous driving mode between a hands-on mode and a hands-off mode. Of the autonomous driving functions, switching of the hands-on mode and the hands-off mode is most effectively utilized by the autonomous steering control function. The autonomous steering control function is used to execute steering control of the host vehicle by controlling the operation of the steering actuator, thereby assisting the driver's operation of the steering wheel. This autonomous steering control function includes, for example, a lane-centering function that controls the steering so as to maintain the vehicle approximately in the center of the lane, a lane-keeping function for controlling the lateral position of the vehicle so as to travel in the same lane, a lane-change assist function for moving from the driving lane to another lane, an overtaking assist function for moving forward by passing next to another vehicle (in an adjacent lane) that is traveling ahead, and a route travel assist function for autonomously changing lanes to follow a route to a destination. Although not limited in this way, the driving control device 1 of the present embodiment controls the drive controller 17 to execute the autonomous steering control function described above in hands-off mode when any one or all of the following conditions are met. That is, when some or all of the following conditions are satisfied, the driving control device 1 controls the drive controller 17 to execute the autonomous steering function in the hands-off mode of the second mode, that is, even if the driver's hands leave the steering wheel.

As one example, conditions for transitioning to the hands-off mode in the lane-centering function are shown below.

- The host vehicle is traveling on an automobile-dedicated road.
- The vehicle is traveling on a road structurally separated from the opposing lane.
- The vehicle is traveling on a road for which a high-precision map is in place and for which using high-precision map information is effective.
- The vehicle is traveling at a vehicle speed less than or equal to the speed limit.
- The vehicle is traveling on a road with a speed limit that is greater than or equal to a prescribed speed (for example, 60 km/h).
- Global Navigational Satellite System: GNSS signals are effective.
- A driver monitoring camera recognizes the driver, and it is detected that the driver is looking ahead.
- The driver is facing forward.
- It has been confirmed that there are no toll booths, motorway exits, merging points, intersections, or lane reduction points in the vicinity of the current location (for example, within about 800 m ahead).
- There are no sharp curves of 100 R or less in the vicinity of the current location (for example, within about 500 m ahead).
- The accelerator pedal is not depressed.
- No abnormality has been detected in any of the radar, sonar, vehicle periphery monitoring camera, and the driver monitoring camera.

If any one of the above-described conditions is not satisfied during execution of the lane-centering function using the hands-off mode, a switch to the lane-centering function using the hands-on mode is executed. The conditions under which the hands-off mode, which is the second mode, is permitted can be defined for each autonomous driving function (lane-keeping function, lane-change assist function, overtaking assist function, or route travel assist function). It is of course a prerequisite that the conditions for activating the autonomous driving functions be met.

Figure 3:
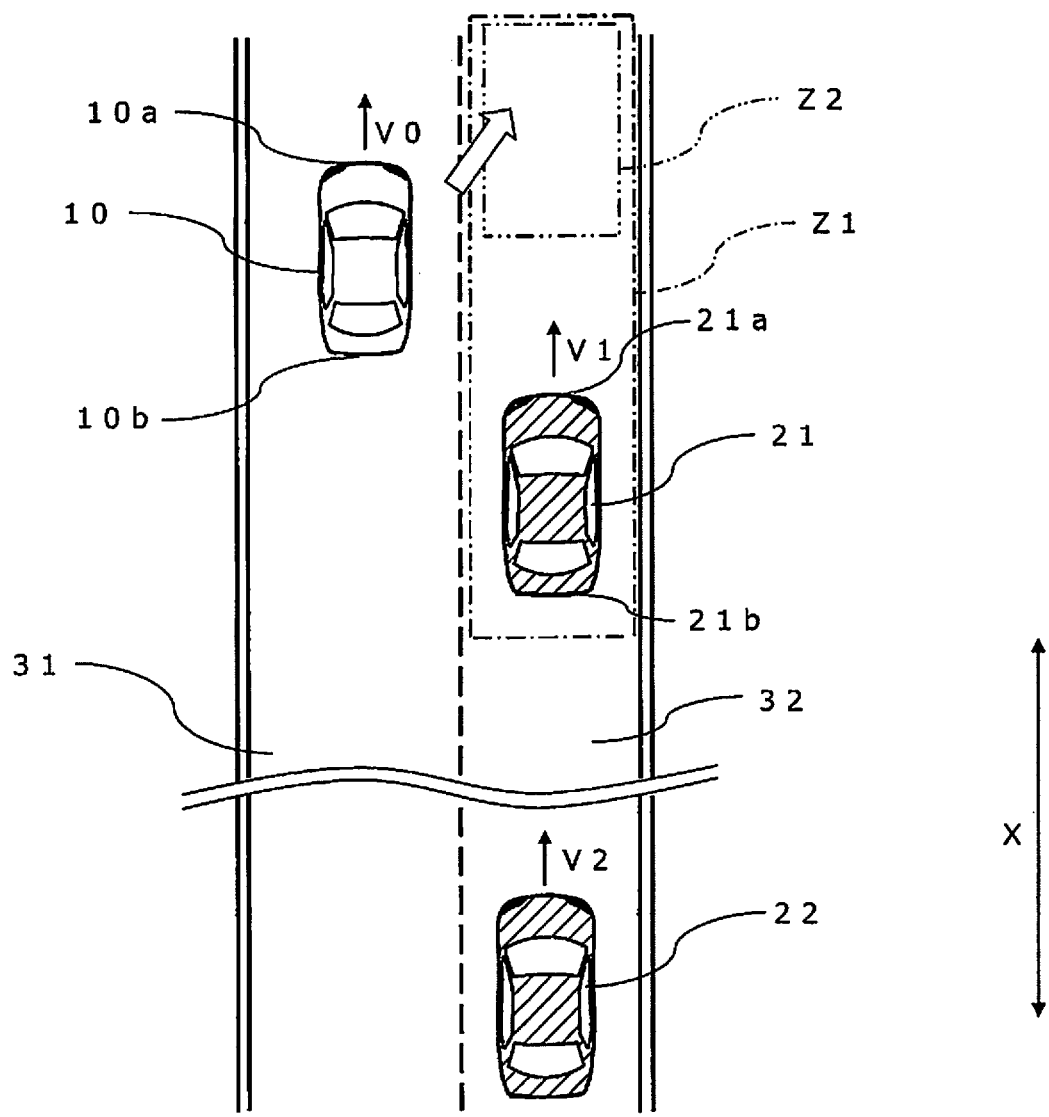
FIG. 3 is a diagram showing an example of a positional relationship between a host vehicle traveling in a first lane and another vehicle traveling in a second lane in the driving control method shown in FIG. 2.
Figure 4:
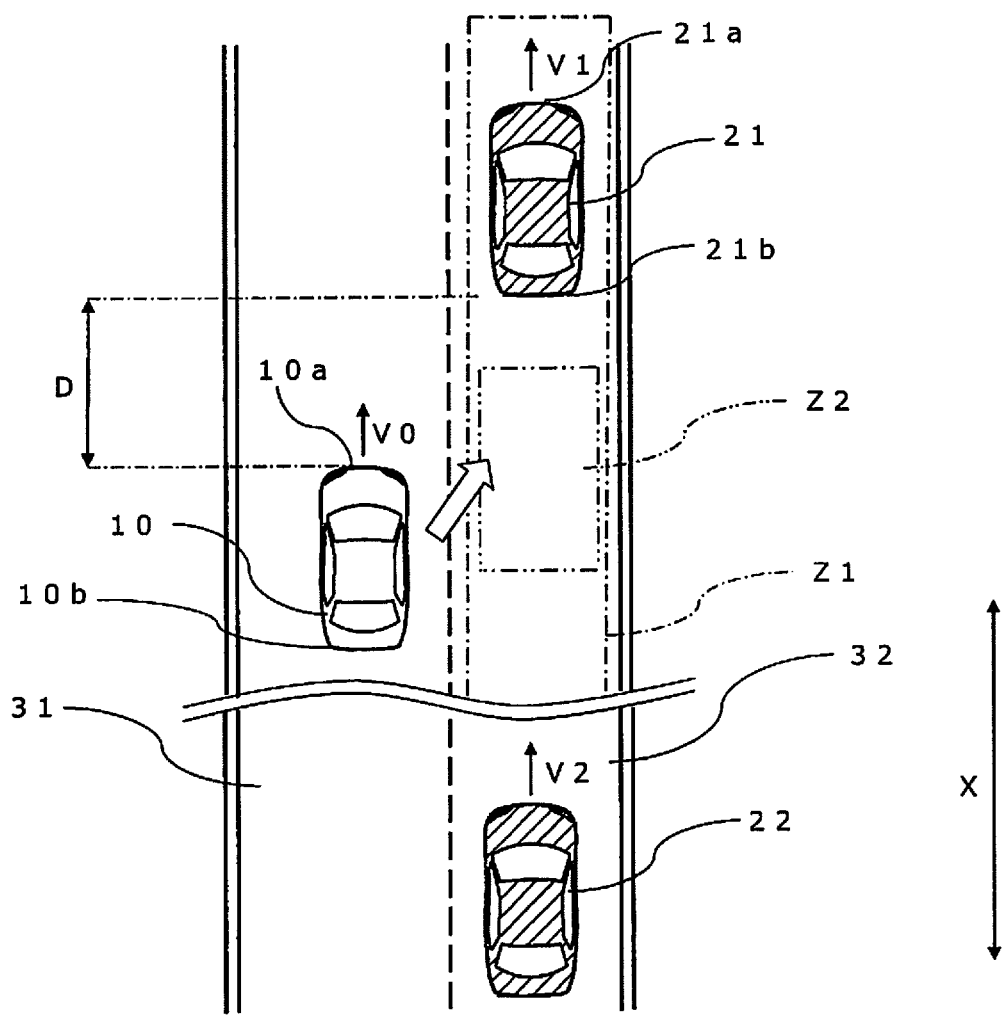
FIG. 4 is a diagram showing another example of a positional relationship between a host vehicle traveling in a first lane and another vehicle traveling in a second lane in the driving control method shown in FIG. 2.

Next, the procedure of the driving control method carried out by the processor 18 of the driving control device 1 will be described with reference to FIGS. 2-4. FIGS. 3 and 4 show a host vehicle 10 traveling in a first lane 31, another vehicle 21 traveling in a second lane 32 adjacent to the first lane 31, and a trailing other vehicle 22, which is a different other vehicle traveling in the second lane 32 behind the other vehicle 21. The vehicle speed of the host vehicle 10 is defined as vehicle speed V0, the vehicle speed of the other vehicle 21 is defined as vehicle speed V1, and the vehicle speed of the trailing other vehicle 22 is defined as vehicle speed V2. Further, in the examples of FIGS. 3 and 4, the relative position of the other vehicle 21 with respect to the host vehicle 10 is assumed to be within a prescribed detection zone Z1. The prescribed detection zone Z1 is a region in which the processor 18 of the driving control device 1 is able to monitor the behavior of the other vehicle 21 via an optical sensor, such as a camera or a radar, of the other vehicle detection unit 11. The range of the detection zone Z1 can be changed as a function of the performance, etc., of the host vehicle 10, and can be set experimentally. Further, FIGS. 3 and 4 show a planned lane change zone Z2, which is the lane-change area that the host vehicle 10 plans to enter. Specifically, the planned lane-change zone Z2 is a position within the second lane 32 set relatively close to the front of the host vehicle 10. The trailing other vehicle 22, on the other hand, is assumed to be traveling behind the host vehicle 10 and the other vehicle 21 and at such a distance from the host vehicle 10 as to be undetectable by the other vehicle detection unit 11 of the host vehicle 10.

Further, in the following description, the lane-change control controls the autonomous movement of the host vehicle 10 traveling in the first lane 31 to the second lane 32, which is different from the first lane 31, that is, control for controlling the host vehicle 10 to change lanes in the autonomous driving mode. Further, the processor 18 of the driving control device 1 controls the various drive devices to execute the control processes and make the determinations described below.

Figure 2:
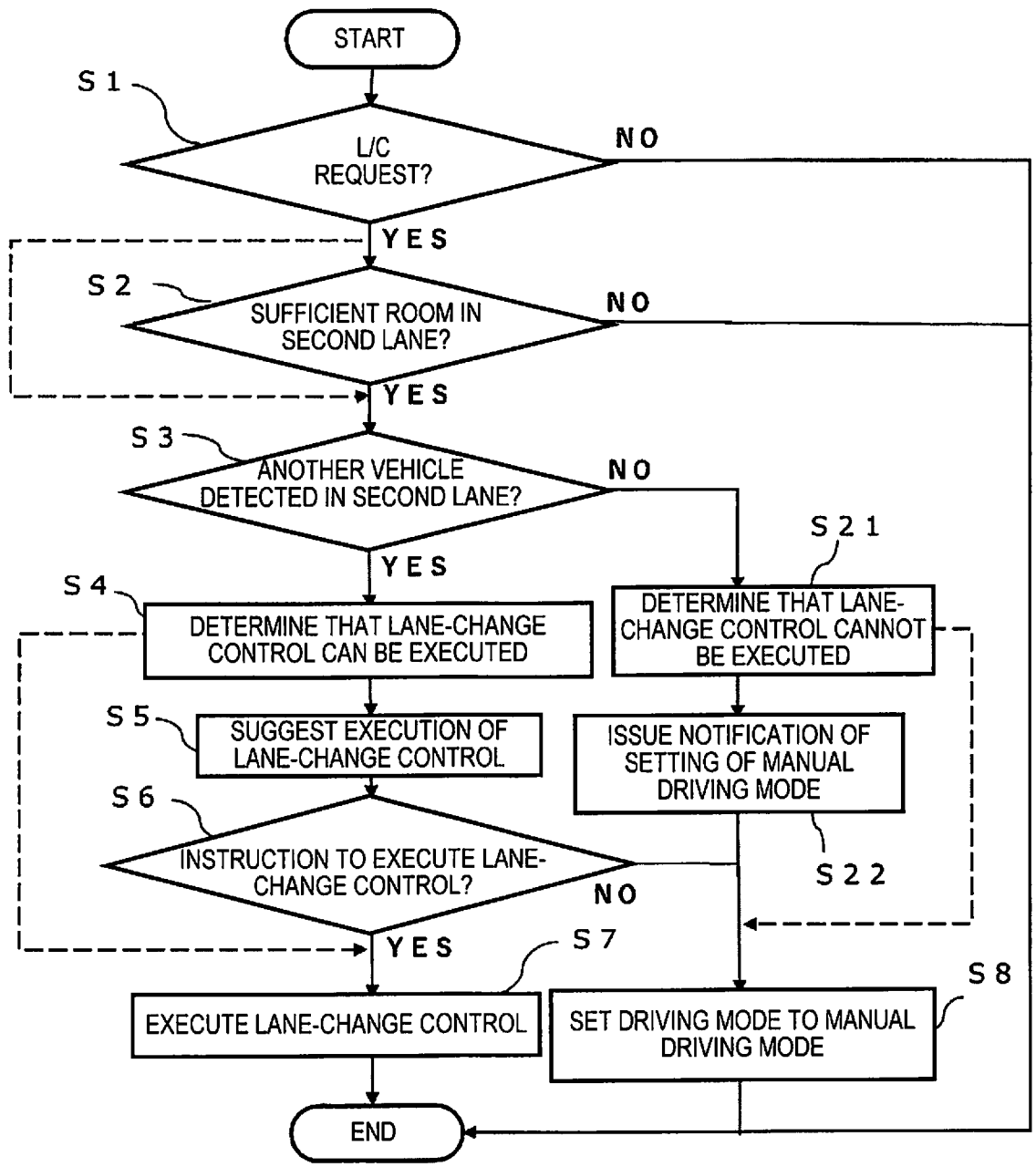
FIG. 2 is a flowchart illustrating the procedure of a driving control method carried out by the driving control device shown in FIG. 1.

As shown in FIG. 2, in Step S1, the processor 18 provided in the driving control device 1 determines whether there is a lane-change request. The processor 18 determines whether there is a lane-change request based on, for example, the presence/absence of a driver operation of a turn signal lever. Further, the processor 18 may determine whether there is a lane-change request based on whether the driver's finger touches a switch on a screen displayed on a display. Further, the processor 18 may determine whether there is a lane-change request based on a travel route to a destination calculated in advance. Further, if it is necessary to avoid a prescribed region on the travel route, it may be determined that there is a lane-change request. A prescribed region to be avoided is one or more of a construction area, an obstacle area, a parked vehicle area, a no-entry area, and an accident area. If there is no lane-change request, control is ended.

If it is determined in Step S1 that a lane change has been requested, control proceeds to Step S2. In Step S2, the processor 18 determines, using various cameras or radars provided in the host vehicle 10, whether there is the required space in the second lane 32 for the host vehicle 10 to execute a lane change. For example, if the road width of the second lane 32 has been reduced due to construction, etc., it is determined that there is no space for the host vehicle 10 to execute a lane change. Further, the presence of numerous other vehicles traveling in the second lane 32 with insufficient room for the host vehicle 10 to cut in is also deemed to be a case in which there is no space for the host vehicle 10 to execute a lane change.

When it is determined that there is no space in the second lane 32 required for the host vehicle 10 to execute a lane change, the processor 18 ends the control. That is, when it is determined that there is no space in the second lane 32 for the host vehicle 10 to execute a lane change, the processor 18 outputs a command to prohibit the execution of lane-change control to the drive controller 17 of the driving control device 1. If it is determined in Step S1 that a lane change has been requested, process control may proceed to Step S3, described further below, without going through Step S2, as indicated by the broken line in FIG. 2. That is, if it is clear, from information in the map database 13 or traffic information, etc., acquired in advance, that there is the required space in the second lane 32 required for a lane change, the process of Step S2 may be skipped.

If it is determined in step S2 that there is the required space in the second lane 32 for the host vehicle 10 to execute a lane change, control goes to Step S3, and the processor 18 determines whether the other vehicle detection unit 11 has detected the presence of another vehicle 21 traveling in the second lane 32 and within the detection zone Z1. That is, the processor 18 determines, based on the detection result acquired from the sensor 11a of the other vehicle detection unit 11, whether another vehicle 21 has been detected traveling within the detection zone Z1 of the second lane 32. Specifically, even if the sensor 11a of the other vehicle detection unit 11 detects the presence of another vehicle via vehicle-to-vehicle communication or road-to-vehicle communication, the processor 18 determines that "another vehicle 21 has been detected" only when this other vehicle 21 is detected within the detection zone Z1 of the second lane 32. The other vehicle 21 may be traveling behind the host vehicle 10, as shown in FIG. 3, or traveling ahead of the host vehicle 10, as shown in FIG. 4. Although this is not illustrated, the other vehicle may be traveling on one side of the host vehicle 10.

In Step S3, if it is determined that another vehicle 21 has not been detected traveling within the detection zone Z1 in the second lane 32, control proceeds to Step S21, and the processor 18 determines that lane-change control cannot be executed. Control then proceeds to Step S22, and the processor 18 issues a notification via the output device 15 that the driving mode at the time of changing lanes will be automatically set to the manual driving mode. That is, based on the determination in Step S22 (information that "lane-change control cannot be executed") the processor 18 outputs information concerning whether lane-change control can be executed to the output device 15. Thus, if the host vehicle 10 is traveling in the autonomous driving mode, the output device 15 notifies an occupant, such as the driver, that the driving mode will be automatically switched from the autonomous driving mode to the manual driving mode. Further, if the host vehicle 10 is traveling in manual driving mode, the output device 15 notifies an occupant, such as the driver, that the manual driving mode will be maintained at the time of the lane change. The notification of the output device 15 is carried out by using a text display on the screen of the display or vocal guidance emitted from the loudspeaker.

Control then proceeds to Step S8, and the processor 18 sets the driving mode to the manual driving mode before the time of the lane change of the host vehicle 10. That is, if the host vehicle 10 is traveling in the autonomous driving mode, the processor 18 switches the driving mode from the autonomous driving mode to the manual driving mode. Further, if the host vehicle 10 is traveling in the manual driving mode, the processor 18 keeps the driving mode in the manual driving mode. The lane change of the host vehicle 10 is thereby executed by using the driver's manual driving operations. That is, if it is determined that the other vehicle detection unit 11 has not detected another vehicle 21 traveling within the detection zone Z1 in the second lane 32, the processor 18 outputs a command to the drive controller 17 of the driving control device 1 to prohibit the execution of lane-change control in autonomous driving mode.

If the host vehicle 10 is traveling in manual driving mode, and it is determined that another vehicle 21 traveling within the detection zone Z1 of the second lane 32 has not been detected, control may proceed to Step S8 without going through Step S22, as indicated by the broken line in FIG. 2. That is, if the host vehicle 10 is traveling in the manual driving mode, the processor 18 can keep the driving mode in the manual driving mode at the time that the lane change is executed without notifying the occupant of the setting of the driving mode at the time of the lane change. In this case as well, based on the determination in Step S21, the processor 18 outputs to the drive controller 17 information regarding whether lane-change control can be executed (here, a command that includes the information that "lane-change control cannot be executed"). Based on this command, the drive controller 17 does not execute lane-change control, and the driving mode of the host vehicle 10 is kept in the manual driving mode.

If, on the other hand, in Step S3 the other vehicle detection unit 11 has detected another vehicle 21 traveling in the second lane 32 within the detection zone Z1, that is, if it determined that another vehicle 21 is detected within the detection zone Z1, control proceeds to Step S4. In Step S4, the processor 18 determines that the lane-change control can be executed. Specifically, even if the vehicle speed V2 of a trailing other vehicle 22, shown in FIGS. 3 and 4, is greater than the vehicle speed V1 of the other vehicle 21, the trailing other vehicle 22 is predicted to decelerate upon approaching the other vehicle 21. Thus, the vehicle speed V2 of the trailing other vehicle 22 is predicted to be approximately equal to the vehicle speed V1 of the other vehicle 21. As a result, the processor 18 determines that the presence of the other vehicle 21 is detected in the second lane 32, and thus determines that it is unlikely that the trailing other vehicle 22 will approach the planned lane-change zone Z2 of the host vehicle 10 from behind at a vehicle speed that is greater than that of the other vehicle 21. That is, the processor 18 selects a situation in which it is unlikely that the trailing other vehicle 22 will approach the host vehicle 10 from behind in the second lane 32 of the lane change destination, and determines that the lane-change control can be executed in situations in which it is determined that it is unlikely that the trailing other vehicle 22 will suddenly enter the planned lane-change zone Z2 of the host vehicle 10. Here, that "the trailing other vehicle 22 will approach the host vehicle 10 at a high speed from behind in the second lane 32 of the lane change destination" means that the vehicle speed V2 of the trailing other vehicle 22 approaching from behind is greater than the vehicle speed V0 of the host vehicle 10 during a lane change to the second lane 32. Usually, when the host vehicle 10 changes lanes to the second lane 32, the vehicle speed V0 of the host vehicle 10 is equal to or almost the same as the vehicle speed V1 of the other vehicle 21 within a certain range (preset prescribed range).

In Step S5, the processor 18 then outputs lane-change information, which includes a suggestion to execute lane-change control, to the output device 15. That is, based on the determination in Step S4, the processor 18 outputs to the output device 15 information regarding whether lane-change control can be executed (a suggestion that includes the information "lane-change control can be executed"). Specifically, the text suggesting the execution of lane-change control (for example, "Do you wish to change lanes in autonomous driving mode?" etc.) is displayed on the screen of the display of the output device 15. Further, the suggested execution of lane-change control may be output audibly from the loudspeaker of the output device 15.

In Step S6, the processor 18 then determines whether an instruction to execute an autonomous lane change has been input by an occupant, such as the driver, based on the lane-change information. Specifically, an approval button to execute lane-change control is displayed, together with the text suggesting the execution of the lane-change control, on the screen of the display that functions as the output device 15 and the input device 16, and the occupant touches the approval button, thereby inputting an instruction to execute the lane-change control. Further, if the audible suggestion to change lanes is output from the loudspeaker serving as the output device 15, the sound of the occupant's spoken response may be detected by a microphone serving as the input device 16, so as to input an instruction to execute the lane-change control. Further, the occupant may input an instruction to execute the lane-change control to the input device 16 by operating the turn signal indicator by using a gesture, an eyelid movement, a line-of-sight movement, etc.

If an instruction to execute the lane-change control is not input in Step S6, control proceeds to Step S8, and the processor 18 sets the driving mode of the host vehicle 10 to the manual driving mode. Between Steps S6 and S8, the processor 18 may notify the occupant in advance that the driving mode will be set to the manual driving mode, as in Step S22.

If an instruction to execute the lane-change control is input in Step S6, based on the lane-change information, control goes to Step S7, and the processor 18 outputs a command to the drive controller 17 of the driving control device 1, thereby executing the lane-change control. Specifically, the processor 18 controls the vehicle speed and the steering of the host vehicle 10 in the autonomous driving mode, and executes the lane-change control of the host vehicle 10 to change the lanes to the second lane 32 adjacent to the first lane 31. If the other vehicle 21 is traveling behind the host vehicle 10, the host vehicle 10 carries out the lane change to the planned lane-change zone Z2 ahead of the other vehicle 21, as shown in FIG. 3. Further, if the other vehicle 21 is traveling ahead of the host vehicle 10, as shown in FIG. 4, the host vehicle 10 carries out the lane change to the planned lane-change zone Z2 behind the other vehicle 21.

That is "behind" and "ahead of" indicate the directions of extension of the first lane 31 and the second lane 32 shown in FIGS. 3 and 4, that is, the forward and rearward positions in the longitudinal direction X, which is the direction of travel of the host vehicle 10. Further, "the other vehicle 21 is traveling behind the host vehicle 10" is a state in which a front end portion 21a of the other vehicle 21 is positioned behind a rear end portion 10b of the host vehicle 10, as shown in FIG. 3. "The other vehicle 21 is traveling ahead of the host vehicle 10" is a state in which the rear end portion 21b of the other vehicle 21 is positioned ahead of a front end portion 10a of the host vehicle 10, as shown in FIG. 4.

Further, if the vehicle speed V1 of the other vehicle 21 is higher than the vehicle speed V0 of the host vehicle 10, and the other vehicle 21 is traveling side-by-side on one side of the host vehicle 10, the processor 18 delays execution of the lane-change control until, as shown in FIG. 4, the other vehicle 21 is positioned ahead of the host vehicle 10. Similarly, if the vehicle speed V1 of the other vehicle 21 is less than the vehicle speed V0 of the host vehicle 10 and the other vehicle 21 is traveling on one side of the host vehicle 10, the processor 18 delays execution of the lane-change control until, as shown in FIG. 3, the other vehicle 21 is positioned behind the host vehicle 1. Further, the processor 18 may control the vehicle speed V0 of the host vehicle 10 and thereby adjust the relative position of the host vehicle 10 with respect to the other vehicle 21, so as to be ahead of or behind the other vehicle 21, and then execute the lane-change control. That "the other vehicle 21 is traveling on one side of the host vehicle 10" means a state in which the length of the host vehicle 10, from the front end portion 10a to the rear end portion 10b, and the length of the other vehicle 21, from the front end portion 21a to the rear end portion 21b, at least partially overlap in the longitudinal direction X.

If it is determined in Step S4 that lane-change control can be executed, the processor 18 may go directly to Step S7, without going through Steps S5 and S6, and execute the lane-change control using the autonomous driving mode. That is, if it is determined that the lane-change control can be executed, the processor 18 may skip the process of suggesting the execution of the lane-change control to the driver and the process of determining whether an instruction for the execution of the lane-change control has been received from an occupant, and execute the lane-change control immediately. Here, too, the processor 18, based on the determination in Step S4, outputs information regarding whether lane-change control can be executed (a command that includes the information that the "lane-change control can be executed") to the drive controller 17 of the driving control device 1. Based on this command, the drive controller 17 executes the lane-change control.

Thus, in the driving control device 1 and the driving control method according to the present embodiment, when it is determined, based on the detection result acquired from the sensor 11a of the other vehicle detection unit 11, that another vehicle 21 has been detected traveling within the prescribed detection zone Z1 in the second lane 32, it is determined that lane-change control can be executed. As shown in FIGS. 3 and 4, when a trailing other vehicle 22 is traveling behind the other vehicle 21, even if the vehicle speed V2 of the trailing other vehicle 22 is greater than the vehicle speed V1 of the other vehicle 21, it is predicted that the trailing other vehicle 22 will decelerate upon approaching the other vehicle 21. Thus, vehicle speed V2 of the trailing other vehicle 22 is predicted to be approximately equal to vehicle speed V1 of the other vehicle 21. As a result of the detection of the other vehicle 21 traveling in the second lane 32, the processor 18 of the driving control device 1 thereby determines that it is unlikely that the trailing other vehicle 22 will enter the planned lane-change zone Z2 of the host vehicle 10 at a higher vehicle speed than that of the other vehicle 21. That is, the processor 18 of the driving control device 1 determines in advance the presence/absence of the other vehicle 21 in the second lane 32, which is the lane changed to, and thereby determines whether lane-change control can be executed. As a result, the processor 18 of the driving control device 1 can control the host vehicle 10 to autonomously change lanes for those situations in which it is unlikely that the trailing other vehicle 22 will approach from behind in the second lane 32 at high speed, that is, in situations in which it is unlikely that the trailing other vehicle 22 will suddenly enter the planned lane-change zone Z2 from behind. In particular, even when the trailing other vehicle 22 is not detected, the processor 18 of the driving control device 1 can assess situations in which it is unlikely that the trailing other vehicle 22 will approach the planned lane-change zone Z2 of the host vehicle 10 from behind at high speed, and then determine that the lane-change control can be executed. On the other hand, when it is determined that another vehicle 21 has not been detected traveling within the prescribed detection zone Z1 in the second lane 32, the processor 18 of the driving control device 1 determines that lane-change control cannot be executed. As a result, the execution of the lane-change control is suppressed in situations other than those in which it is unlikely that the trailing other vehicle 22 will suddenly enter the planned lane-change zone Z2 from behind. Further, based on the determination regarding whether the lane-change control can be executed, the processor 18 of the driving control device 1 outputs information regarding whether lane-change control can be executed to an output target. The output target may be the output device 15, the drive controller 17, or both the output device 15 and the drive controller 17. That is, this output target is the output device 15 and/or the drive controller 17 of the driving control device 1. Further, the information regarding whether the lane-change control can be executed includes a "suggestion" and/or "notification" output to the output device 15 as well as a "command" output to the drive controller 17.

If it is determined that the lane-change control can be executed, the processor 18 of the driving control device 1 outputs lane-change information suggesting execution the lane-change control to the output device 15. Then, if an occupant, such as the driver, based on the lane-change information, inputs an instruction to execute the lane-change control to the input device 16, the processor 18 of the driving control device 1 executes the lane-change control. The processor 18 of the driving control device 1 can thus execute the lane-change control in accordance with the intentions of the occupant, such as the driver.

On the other hand, if it is determined in Step S4 that the lane-change control can be executed, the processor 18 of the driving control device 1 may execute the lane-change control in Step S7 without going through Steps S5 and S6, as indicated by the broken line in FIG. 2. That is, the processor 18 of the driving control device 1, based on the determination in Step S4, outputs to the drive controller 17 information regarding whether lane-change control can be executed (a command that includes information that "lane-change control can be executed"). As a result, the processor 18 of the driving control device 1 can execute the lane-change control quickly, without going through the process of outputting lane-change information to the output device 15 or the process of receiving an instruction to execute the lane-change control that was input to the input device 16, in those situations in which it is unlikely that the trailing other vehicle 22 will suddenly enter the planned lane-change zone Z2.

If it is determined that another vehicle 21 has not been detected within the detection zone Z1, the processor 18 of the driving control device 1 determines that execution of the lane-change control is not possible, outputs a command to prohibit the execution of the lane-change control in the autonomous driving mode to the drive controller 17 of the driving control device 1, and sets the driving mode to the manual driving mode. As a result, the execution of the lane-change control by the processor 18 is suppressed in situations other than those in which it is determined that it is unlikely that the trailing other vehicle 22 will suddenly enter the planned lane-change zone Z2 from behind. That is, the processor 18 of the driving control device 1 can execute the lane-change control restrictively (or selectively), i.e., limited to those situations in which it is unlikely that the trailing other vehicle 22 will suddenly enter the planned lane-change zone Z2 from behind. Further, in situations other than those in which it is determined that it is unlikely that the trailing other vehicle 22 will suddenly enter the planned lane-change zone Z2 from behind, the driver of the host vehicle 10 can manually change lanes to the second lane 32 while visually checking travel conditions of the host vehicle 10.

When it is determined that there is insufficient room for the host vehicle 10 to execute a lane change to the second lane 32, the processor 18 outputs a command to prohibit execution of the lane-change control to the drive controller 17 of the driving control device 1. As a result, the processor 18 of the driving control device 1 can execute the lane-change control only when the necessary conditions for the host vehicle 10 to execute a lane change have been met.

Figure 5:
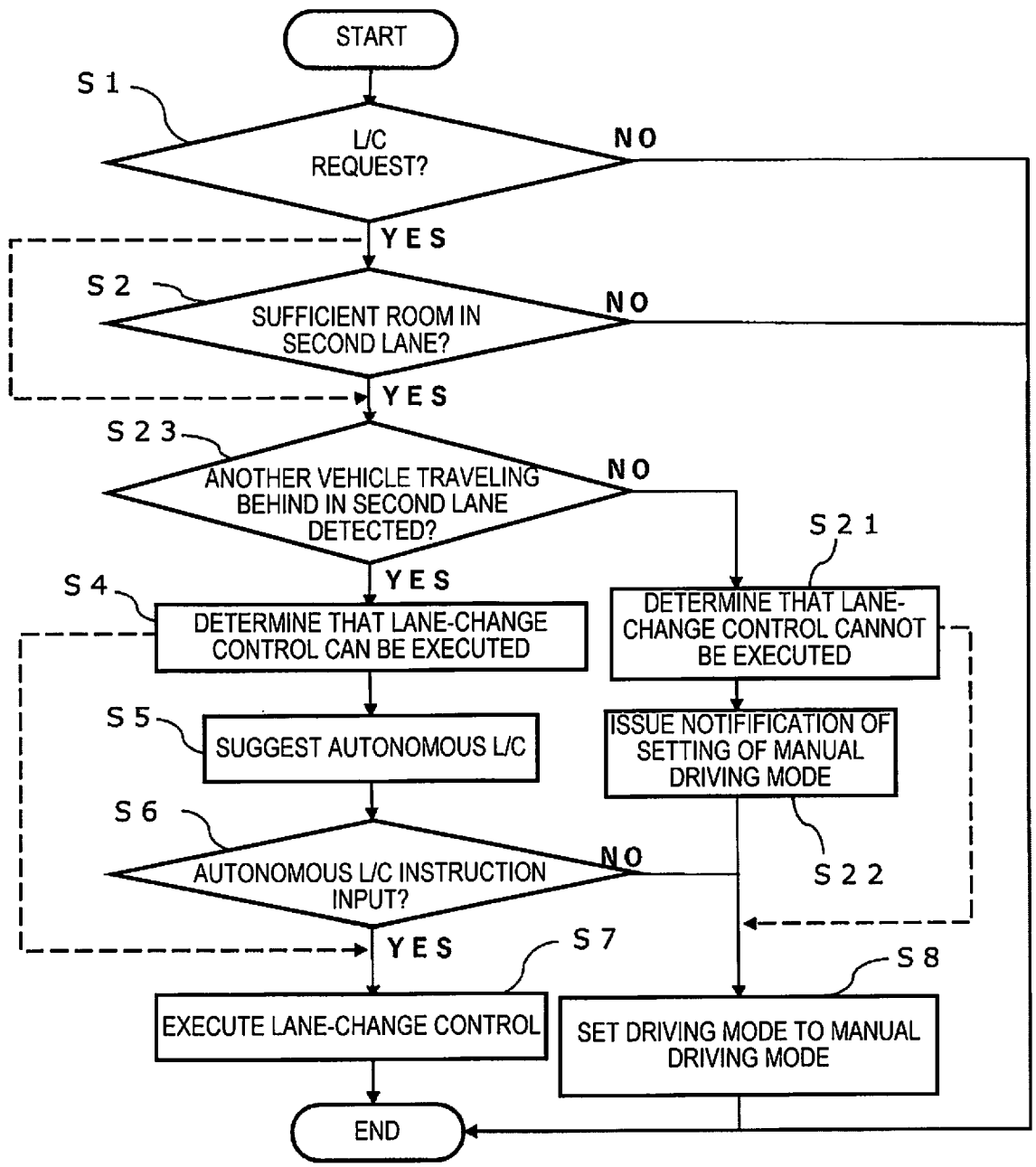
FIG. 5 is a flowchart showing another example of the procedure of the driving control method shown in FIG. 2.

In the present embodiment, as shown in FIG. 5, the processor 18 can execute the process of Step S23 instead of the process of Step S3 in FIG. 2, and determine whether the other vehicle 21 traveling behind the host vehicle 10 is detected within the detection zone Z1 in the second lane 32. That is, in the example shown in FIG. 5, in Step S4, the processor 18 executes a process to determine that lane-change control can be executed only when it is determined that another vehicle 21 behind the host vehicle 10 has been detected within the detection zone Z1, as shown in FIG. 3. Here, it is unlikely that the trailing other vehicle 22 will overtake the other vehicle 21, which is behind the host vehicle 10, and appear ahead of the other vehicle 21. Therefore, it is also unlikely that the trailing other vehicle 22 will suddenly enter the planned lane-change zone Z2 of the host vehicle 10 at the same time that the host vehicle 10 changes lanes to the second lane 32. Therefore, the processor 18 of the driving control device 1 can limit the detection range of the other vehicle 21 to the rear side of the host vehicle 10, and thereby execute the lane-change control in those situations in which it is highly unlikely that the trailing other vehicle 22 will suddenly enter the planned lane-change zone Z2 from behind.

Second Embodiment

The procedure of the driving control method carried out by the processor 18 of the driving control device 1 according to the second embodiment will be described with reference to FIG. 6. The same reference symbols as those shown in FIGS. 1-5 indicate identical or similar constituent elements or control steps, so that redundant explanations are omitted, and reference to the descriptions in the first embodiment is implied.

Figure 6:
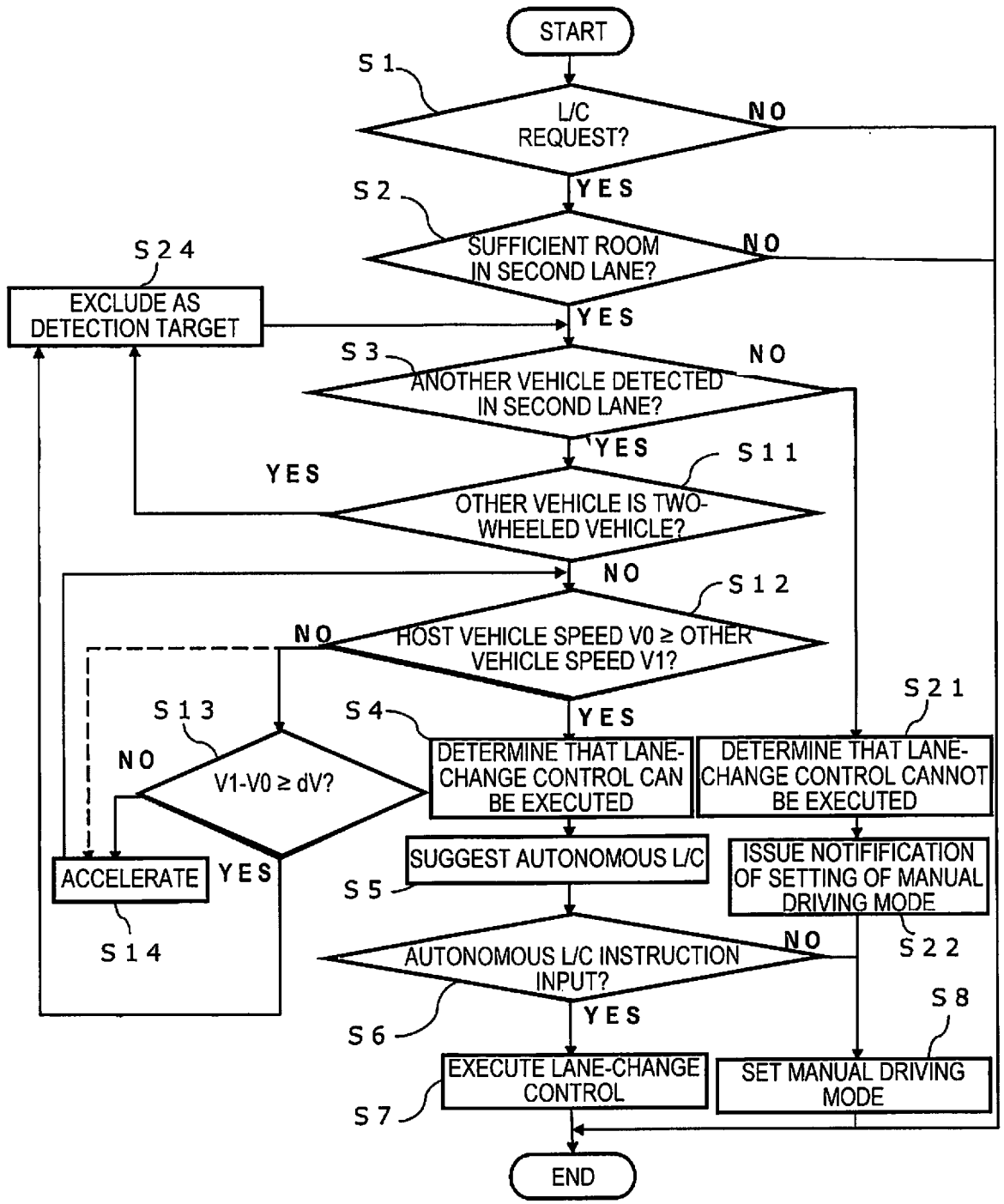
FIG. 6 is a flowchart illustrating the procedure of a driving control method carried out by a driving control device according to a second embodiment of the present invention.

As shown in FIG. 6, if it is determined in Step S3 that another vehicle 21 traveling in the second lane 32 within the detection zone Z1 has been detected, in Step S11 the processor 18 determines whether the other vehicle 21 detected by the other vehicle detection unit 11 is a two-wheeled vehicle, such as a motorcycle. Whether the other vehicle 21 is a two-wheeled vehicle can be determined based on an image captured by a camera, which is one of the sensors 11a of the other vehicle detection unit 11, using a pattern matching method, or the like. If the other vehicle 21 is a two-wheeled vehicle, control proceeds to Step S24, and the processor 18 excludes the other vehicle 21 as a detection target. That is, in Step S24, the processor 18 cancels the determination of Step S3 that "another vehicle traveling in the second lane 32 has been detected." Control then returns to Step S3 and the processor 18 again determines whether the other vehicle detection unit 11 has detected the presence of a different other vehicle traveling in the second lane 32 within the detection zone Z1.

If it is determined in Step S11 that the other vehicle 21 is not a two-wheeled vehicle, control shifts to Step S12 and the processor 18 determines whether vehicle speed V0 of the host vehicle 10 is greater than the vehicle speed V1 of the other vehicle 21. The processor 18 detects the vehicle speed V0 of the host vehicle 10 detected by the vehicle speed sensor and the vehicle speed V1 of the other vehicle 21 based on the relative position of the other vehicle 21 with respect to the host vehicle 10. Further, the other vehicle detection unit 11 of the driving control device 1 may detect the vehicle speed V1 of the other vehicle 21 based on vehicle speed information of the other vehicle 21 acquired by using vehicle-to-vehicle communication. If it is determined that the vehicle speed V0 of the host vehicle 10 is less than the vehicle speed V1 of the other vehicle 21, that is, that the vehicle speed V1 of the other vehicle 21 is greater than the vehicle speed V0 of the host vehicle 10, control shifts to Step S13.

In Step S13, the processor 18 determines whether the difference between vehicle speed V0 of the host vehicle 10 and vehicle speed V1 of the other vehicle 21 is greater than or equal to a prescribed speed difference dV. If the difference between vehicle speed V0 of the host vehicle 10 and vehicle speed V1 of the other vehicle 21 is greater than or equal to the prescribed speed difference dV, control proceeds to Step S24, and the processor 18 excludes the other vehicle 21 as a detection target. That is, in Step S24, the processor 18 cancels the determination of Step S3 that "another vehicle traveling in the second lane 32 has been detected" and control returns to Step S3. In Step S3, the processor 18 again determines whether the other vehicle detection unit 11 has detected another vehicle traveling in the second lane 32 within the detection zone Z1. In this case, this other vehicle detected by the other vehicle detection unit 11 may be a different vehicle than the other vehicle 21. Further, if the other vehicle 21 decelerates and the difference between vehicle speed V0 of the host vehicle 10 and vehicle speed V1 of the other vehicle 21 becomes less than the prescribed speed difference dV, the other vehicle 21 may be re-set as a detection target in Step S3.

On the other hand, if the difference between vehicle speed V0 of the host vehicle 10 and vehicle speed V1 of the other vehicle 21 is less than the prescribed speed difference dV, control goes to Step S14 and the processor 18 outputs a command to the drive controller 17 of the driving control device 1 to accelerate the host vehicle 10 such that the vehicle speed V0 of the host vehicle 10 becomes greater than or equal to the vehicle speed V1 of the other vehicle 21. That is, the processor 18 controls the vehicle speed V0 of the host vehicle 10 such that vehicle speed V0 of the host vehicle 10 becomes greater than or equal to vehicle speed V1 of the other vehicle 21. Control then returns to Step S12, and the processor 18 again determines whether vehicle speed V0 of the host vehicle 10 is greater than or equal to vehicle speed V1 of the other vehicle 21. The prescribed speed difference dV is the upper limit value of the speed difference of the degree to which the host vehicle 10 can change lanes while accelerating and maintaining a certain distance from the other vehicle 21. The prescribed speed difference dV is determined experimentally and is based on the performance of the host vehicle 10.

On the other hand, if it is determined in Step S12 that vehicle speed V0 of the host vehicle 10 is greater than or equal to vehicle speed V1 of the other vehicle 21, process control goes to Step S4, and the processor 18 determines that the lane-change control in the autonomous driving mode can be executed.

Thus, in the driving control device 1 and the driving control method according to the present embodiment, when vehicle speed V0 of the host vehicle 10 is greater than or equal to vehicle speed V1 of the other vehicle 21, it is determined that lane-change control can be executed. If the vehicle speed V0 of the host vehicle 10 is less than the vehicle speed V1 of the other vehicle 21, the processor 18 of the driving control device 1 outputs a command to the drive controller 17 of the driving control device 1 to control the vehicle speed V0 of the host vehicle 10, such that vehicle speed V0 of the host vehicle 10 becomes greater than or equal to vehicle speed V1 of the other vehicle 21. As a result, the processor 18 of the driving control device 1 is able to smoothly change lanes of the host vehicle 10 in a state in which vehicle speed V0 of the host vehicle 10 is the same as vehicle speed V1 of the other vehicle 21, or is greater than the vehicle speed V1 of the other vehicle 21. Further, if the vehicle speed V1 of the other vehicle 21 is less than or equal to vehicle speed V0 of the host vehicle 10, it becomes less likely that a trailing other vehicle 22 will approach the planned lane-change zone Z2 of the host vehicle 10 at a vehicle speed that is greater than that of the host vehicle 10 at the time that the lane-change control is executed. The control of vehicle speed V0 of the host vehicle 10 by the driving control device 1 is not limited to acceleration. For example, if the other vehicle 21 suddenly decelerates, the processor 18 of the driving control device 1 may reduce vehicle speed V0 of the host vehicle 10 to maintain the same inter-vehicular distance from the other vehicle 21, or execute control to maintain a constant speed without changing vehicle speed V0 of the host vehicle 10.

Further, if the vehicle speed V1 of the other vehicle 21 is greater than the vehicle speed V0 of the host vehicle 10 and the difference between vehicle speed V0 of the host vehicle 10 and vehicle speed V1 of the other vehicle 21 is greater than or equal to the prescribed speed difference dV, the processor 18 of the driving control device 1 cancels the determination of Step S3 that "another vehicle traveling in the second lane 32 has been detected." This is due to the fact that if the vehicle speed V1 of the other vehicle 21 is too high compared with vehicle speed V0 of the host vehicle 10, it is likely that the trailing other vehicle 22 will also approach the planned lane-change zone Z2 at a greater vehicle speed than that of the host vehicle 10 at the time that the lane-change control is executed by the driving control device 1. Therefore, the processor 18 of the driving control device 1 of the present embodiment can execute the lane-change control of the host vehicle 10 restrictively (or selectively), i.e., limited to those situations in which it is unlikely that the trailing other vehicle 22 will suddenly enter the planned lane-change zone Z2 from behind. Further, when the difference between vehicle speed V0 of the host vehicle 10 and vehicle speed V1 of the other vehicle 21 is greater than or equal to the prescribed speed difference dV, since it is not necessary to match the vehicle speed V0 of the host vehicle 10 to the vehicle speed V1 of the other vehicle 21, the processor 18 of the driving control device 1 can prevent a sudden acceleration of the host vehicle 10 when the lane-change control is executed.

Further, the processor 18 of the driving control device 1 cancels the determination of Step S3 that "another vehicle traveling in the second lane 32 has been detected" even if the other vehicle 21 is a two-wheeled vehicle. This is due to the fact that if the other vehicle 21 is a two-wheeled vehicle, the psychological pressure that the driver of the trailing other vehicle 22 would experience would be less compared to cases in which the other vehicle 21 is a passenger car or a large truck; thus, such a trailing other vehicle 22 may not decelerate upon approaching the other vehicle 21. That is, if the other vehicle 21 is a two-wheeled vehicle, it becomes more likely that the trailing other vehicle 22 will approach the planned lane-change zone Z2 of the host vehicle 10 from behind at high speed, compared to cases in which the other vehicle 21 is a passenger car or a large truck. Therefore, the processor 18 of the driving control device 1 of the present embodiment can execute the lane-change control of the host vehicle 10 restrictively (or selectively), i.e., limited to those situations in which it is unlikely that a trailing other vehicle 22 will suddenly enter the planned lane-change zone Z2 from behind.

In the present embodiment, if it is determined in Step S12 of FIG. 6 that vehicle speed V0 of the host vehicle 10 is less than the vehicle speed V1 of the other vehicle 21, control may proceed to Step S14 without going through Step S13, as indicated by the broken line in FIG. 6. That is, if it is determined that vehicle speed V0 of the host vehicle 10 is less than the vehicle speed V1 of the other vehicle 21, the processor 18, irrespective of the difference between vehicle speed V0 of the host vehicle 10 and vehicle speed V1 of the other vehicle 21, may control the vehicle speed V0 of the host vehicle 10 to accelerate the host vehicle 10.

Further, in Step S3 of FIG. 6, if another vehicle 21 is detected in the detection zone Z1 of the second lane 32, control may skip Step S11 and proceed to Step S12. That is, it is not necessary for the processor 18 to determine whether the other vehicle 21 is a two-wheeled vehicle. Further, Step S2 of FIG. 6 may be skipped, in the same manner as in the first embodiment. Further, Steps S5 and S6 of FIG. 6 may also be skipped, in the same manner as in the first embodiment. Thus, even if any of Steps S2, S5, S6, and S11 is skipped, the processor 18 can execute the lane-change control in a situation in which it is unlikely that the trailing other vehicle 22 will suddenly enter the planned lane-change zone Z2 from behind, as described above.

Third Embodiment

The procedure of the driving control method carried out by the processor 18 of the driving control device 1 according to the third embodiment will be described with reference to FIG. 7. The same reference symbols as those shown in FIGS. 1-6 indicate identical or similar constituent elements or control steps, so that redundant explanations are omitted, and reference to the first and second embodiments is implied.

Figure 7:
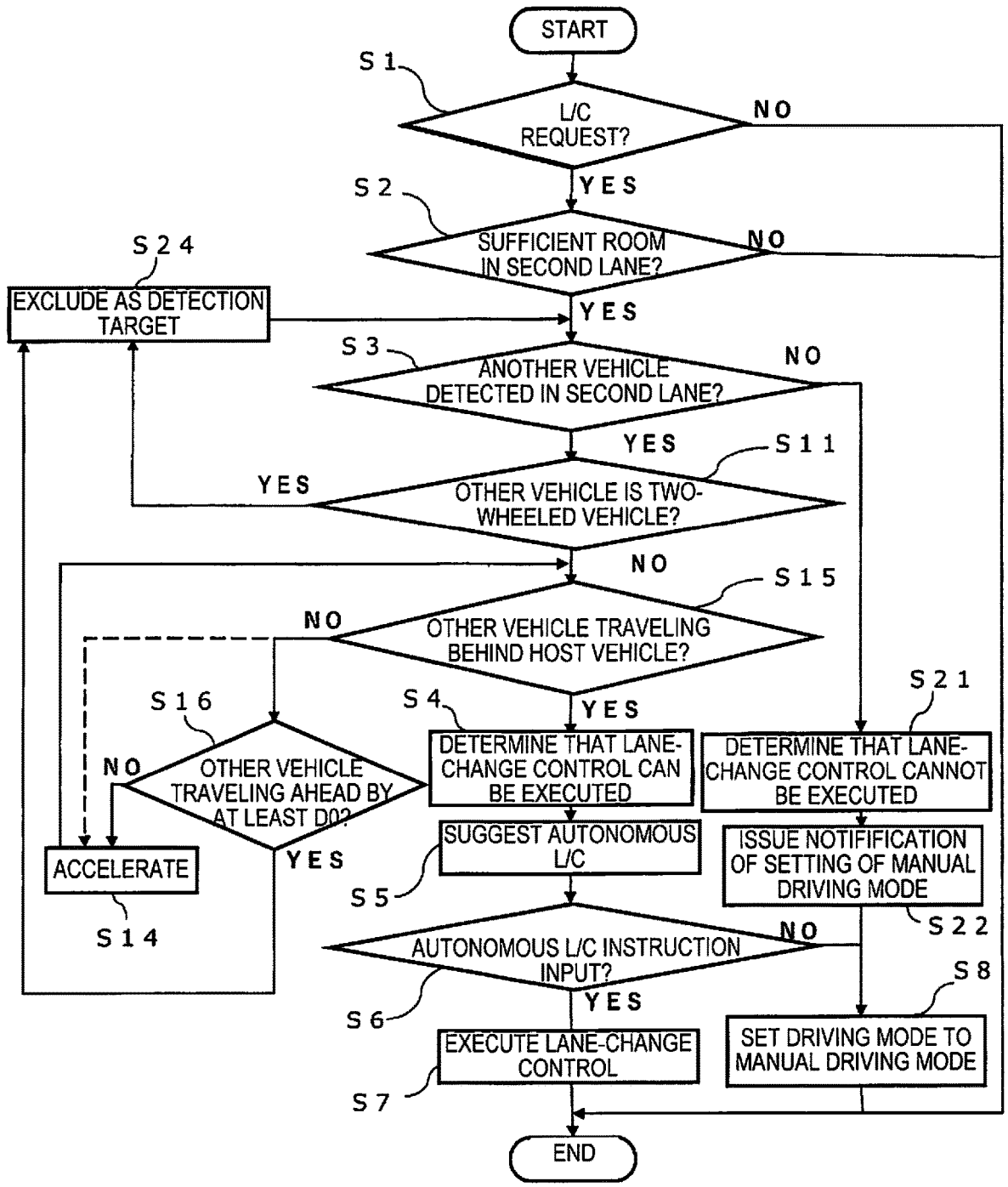
FIG. 7 is a flowchart illustrating the procedure of a driving control method carried out by a driving control device according to a third embodiment of the present invention.

As shown in FIG. 7, in Step S11, if it is determined that the other vehicle 21 is not a two-wheeled vehicle, control goes to Step S15 and the processor 18 uses a camera or a radar of the other vehicle detection unit 11 to determine whether the other vehicle 21 is traveling behind the host vehicle 10. If it is determined that the other vehicle 21 is not traveling behind the host vehicle 10, that is, if it is determined that the other vehicle 21 is traveling to one side or ahead of the host vehicle 10, control goes to Step S16.

In Step S16, the processor 18 determines whether the other vehicle 21 is traveling ahead of the host vehicle 10 by at least a prescribed distance D0. That is, the processor 18 determines whether the other vehicle 21 is traveling ahead of the host vehicle 10 and the longitudinal interval D between the host vehicle 10 and the other vehicle 21 is greater than or equal to the prescribed distance D0. As shown in FIG. 4, the longitudinal interval D between the host vehicle 10 and the other vehicle 21 is equal to the distance between the front end portion 10a of the host vehicle 10 and the rear end portion 21b of the other vehicle 21 in the longitudinal direction X (direction of travel of the host vehicle 10). Further, the other vehicle detection unit 11 detects the relative position of the other vehicle 21 with respect to the host vehicle 10 using a radar, or the like. Further, the other vehicle detection unit 11 may detect the relative position of the other vehicle 21 with respect to the host vehicle 10 based on the position information of the other vehicle 21 detected by using vehicle-to-vehicle communication.

If it is determined in Step S16 that the other vehicle 21 is traveling ahead of the host vehicle 10 by at least the prescribed distance D0, control proceeds to Step S24, and the processor 18 excludes the other vehicle 21 as a detection target. That is, in Step S24, the processor 18 cancels the determination of Step S3 that "another vehicle has been detected traveling in the second lane 32" and control returns to Step S3. In Step S3, the processor 18 again determines whether the other vehicle detection unit 11 has detected the presence of another vehicle traveling in the second lane 32. In this case, this other vehicle detected by the other vehicle detection unit 11 may be a different vehicle than the other vehicle 21, and the other vehicle 21 may again be made the detection target in Step S3 if the other vehicle 21 decelerates and the longitudinal interval D between the host vehicle 10 and the other vehicle 21 becomes less than the prescribed distance D0.

On the other hand, in Step S16, if it is determined that the longitudinal interval D between the host vehicle 10 and the other vehicle 21 is less than the prescribed distance D0, control goes to Step S14, and the processor 18 accelerates the host vehicle 10 until the other vehicle 21 is positioned behind the host vehicle 10. That is, the processor 18 controls vehicle speed V0 of the host vehicle 10 so that the host vehicle 10 travels to a position ahead of the other vehicle 21. Control then returns to Step S15, and the processor 18 again determines whether the other vehicle 21 is traveling behind the host vehicle 10. The prescribed distance D0 is less than or equal to the maximum longitudinal interval D between the host vehicle 10 and the other vehicle 21 within the detection zone Z1, and is set experimentally and is based on the performance of the host vehicle 10. More specifically, the prescribed distance D0 is the maximum extent, insofar as it can be predicted, that the other vehicle 21 would be separated from the front side of the host vehicle 10 so as to be undetectable by the optical sensor of the other vehicle detection unit 11, immediately after the other vehicle 21 accelerates.

On the other hand, in Step S15, if it is determined that the other vehicle 21 is traveling behind the host vehicle 10, control goes to Step S4, and the processor 18 determines that the lane-change control can be executed.

Therefore, if the other vehicle 21 is traveling ahead of the host vehicle 10 and the longitudinal interval D between the host vehicle 10 and the other vehicle 21 (distance in the direction of travel of the host vehicle 10) is greater than or equal to the prescribed distance D0, the processor 18 of the driving control device 1 cancels the determination of Step S3 that "another vehicle has been detected traveling in the second lane 32." This is due to the fact that if the longitudinal interval D between the host vehicle 10 and the other vehicle 21 is too great, there is the possibility that the trailing other vehicle 22 will overtake the host vehicle 10 and then decelerate, so that it becomes likely that the trailing other vehicle 22 will approach the planned lane-change zone Z2 of the host vehicle 10 at a higher vehicle speed than the host vehicle 10. Therefore, the processor 18 of the driving control device 1 in the present embodiment can execute the lane-change control of the host vehicle 10 restrictively (or selectively), i.e., limited to those situations in which it is unlikely that the trailing other vehicle 22 will suddenly enter the planned detection zone Z1 in the second lane 32. Further, if the other vehicle 21 is ahead of and separated from the host vehicle 10 by at least the prescribed distance D0, it is not necessary to accelerate the host vehicle 10; therefore, the processor 18 of the driving control device 1 can prevent a sudden acceleration of the host vehicle 10 when lane-change control is executed. Further, because the host vehicle 10 is accelerated only when the longitudinal interval D between the host vehicle 10 and the other vehicle 21 is less than the prescribed distance D0, the processor 18 of the driving control device 1 can execute the lane-change control in a state in which the other vehicle 21 is being constantly detected by the optical sensor of the other vehicle detection unit 11.

In the present embodiment, in Step S15 of FIG. 7, if it is determined that the other vehicle 21 is not traveling behind the host vehicle 10, process control may proceed to Step S14 without going to Step S16, as indicated by the broken line in FIG. 7. That is, if it is determined that the other vehicle 21 is not traveling behind the host vehicle 10, the processor 18 may control the vehicle speed V0 of the host vehicle 10 irrespective of the longitudinal interval D between the host vehicle 10 and the other vehicle 21 and accelerate the host vehicle 10.

Further, Step S2 of FIG. 7 may be skipped, in the same manner as in the first embodiment. Further, Steps S5 and S6 of FIG. 7 may also be skipped, in the same manner as in the first embodiment. Further, Step S11 of FIG. 7 may be skipped in the same manner as in the second embodiment. In this manner, even if any of Steps S2, S5, S6, and S11 is skipped, the processor 18 can execute the lane-change control in situations in which it is unlikely that the trailing other vehicle 22 will suddenly enter the planned lane-change zone Z2 from behind, as described above.

Fourth Embodiment

The driving control device 1 according to the fourth embodiment will be described with reference to FIG. 1, and the procedure of the driving control method carried out by the processor 18 of the driving control device 1 will be described with reference to FIG. 8. The same reference symbols as those shown in FIGS. 1-7 indicate identical or similar constituent elements or control steps, so that redundant explanations are omitted, and reference to the first through third embodiments is implied.

In the present embodiment, the processor 18 of the driving control device 1 shown in FIG. 1 can set the driving mode to a first mode or a second mode. That is, the processor 18 can switch the driving mode between the first mode and the second mode. The driving assistance level of the second mode is higher than the driving assistance level of the first mode. Specifically, the processor 18 can set the first mode corresponding to the driving assistance level 2 and the second mode corresponding to the driving assistance level 3 as the driving modes. These driving assistance levels are determined, without limitation thereto, by a classification scheme according to the definitions of the aforementioned US Society of Automotive Engineers.

If the driving mode is set to the first mode, the driver must visually monitor the surrounding conditions of the host vehicle. Further, the first mode is a hands-on mode. The hands-on mode is one in which autonomous steering control by the driving control device 1 does not operate when the driver is not holding the steering wheel 14*a*. Whether the driver is holding the steering wheel 14*a* is detected by a steering torque sensor of the EPS or by a touch sensor provided on the steering wheel 14*a*. "Driver holding the steering wheel 14*a*" is not limited to a state in which the driver is firmly gripping the steering wheel 14*a*, but also includes a state in which the driver is lightly touching the steering wheel 14*a*.

If the driving mode is set to the second mode, on the other hand, the other vehicle detection unit 11 of the driving control device 1 monitors the surrounding conditions of the host vehicle using a camera, a radar, or the like. That is, if the autonomous driving mode is set to the second mode, the travel environment in the vicinity of the host vehicle is automatically monitored by the driving control device 1. Further, the second mode is a hands-off mode. A hands-off mode is one in which the steering control by the processor 18 operates even if the driver's hands leave the steering wheel 14*a*. The second mode is an autonomous driving mode.

In addition to the first mode and the second mode, the processor 18 can set other driving modes corresponding to different driving assistance levels. In the present embodiment, a driving mode having a lower driving assistance level than the first mode may be provided, and a mode having a driving assistance level higher than the second mode may be provided. One or a plurality of modes having a driving assistance level higher than the first mode and lower than the second mode may be set between the first mode and the second mode.

The procedure of the driving control method carried out by the driving control device 1 will now be described with reference to FIG. 8. As shown in FIG. 8, in Step S3, if another vehicle 21 is detected traveling within the detection zone Z1 in the second lane 32, in Step S17, the processor 18 determines that lane-change control in the second mode can be executed. In Step S18, the processor 18 then sets the driving mode to the second mode, which is an autonomous driving mode. In Step S19, the processor 18 then executes the lane-change control in the second mode. That is, based on the determination of Step S17, the processor 18 outputs information to the drive controller 17 of the driving control device 1 regarding whether a lane-change control can be executed (a command that includes information that "lane-change control in the second mode can be executed").

Further, in Step S3, if another vehicle 21 is not detected traveling within the detection zone Z1 in the second lane 32, in Step S30, the processor 18 determines that lane-change control in the second mode cannot be executed. In Step S31, the processor 18 then sets the driving mode to the first mode. In Step S32, the processor 18 then executes the lane-change control in the first mode. That is, based on the determination in Step S30, the processor 18 outputs information to the drive controller 17 regarding whether lane-change control can be executed (a command that includes information that "lane-change control in the second mode cannot be executed").

In the present embodiment, the first mode is an autonomous driving mode, but no limitation thereto is implied, and the first mode may be a manual driving mode. If the first mode is a manual driving mode, the driver changes lanes in the manual driving after Step S31, so that Step S32 of FIG. 8 is skipped.

From the foregoing, when it is determined, based on the detection result acquired from the sensor 11*a*, that another vehicle 21 has been detected traveling within the prescribed detection zone Z1 in the second lane 32, the processor 18 of the driving control device 1 determines that the lane-change control in the second mode can be executed. Further, if it is determined that another vehicle 21 has not been detected traveling within the detection zone Z1 in the second lane 32, the processor 18 of the driving control device 1 determines that the lane-change control in the second mode cannot be executed. The processor 18 of the driving control device 1 can switch the driving mode between the first mode that requires the driver's visual monitoring of the surrounding conditions of the host vehicle, and the second mode, which is an autonomous driving mode in which the driving control device 1 executes the monitoring of the surrounding conditions of the host vehicle. That is, if another vehicle 21 is detected within the detection zone Z1 and it is determined that it is unlikely that a trailing other vehicle 22 will approach the planned lane-change zone Z2 of the host vehicle 10 from behind at a higher speed than the other vehicle 21, the processor 18 of the driving control device 1 determines that lane-change control in the second mode with monitoring of the surrounding conditions of the host vehicle 10 can be executed. On the other hand, if another vehicle 21 is not detected within the detection zone Z1, the processor 18 of the driving control device 1 sets the driving mode to the first mode. As a result, if another vehicle 21 is not detected within the detection zone Z1, the lane change of the host vehicle 10 is carried out in a state in which the surrounding conditions of the host vehicle 10 are monitored visually by the driver. Therefore, if it is determined to be unlikely that a trailing other vehicle 22 will suddenly enter the planned lane-change zone Z2 from behind, the processor 18 of the driving control device 1 can execute the lane-change control at a higher driving assistance level. Thus, if it is determined that another vehicle 21 is detected within the detection zone Z1, the processor 18 of the driving control device 1 can execute the lane-change control in the second mode, thereby reducing the burden on the driver.

Further, of the autonomous driving modes set by the driving control device 1, the first mode is a hands-on mode in which steering control by the driving control device 1 does not operate when the driver is not holding the steering wheel 14*a*. On the other hand, the second mode is a hands-off mode in which steering control by the driving control device 1 operates even if the driver's hands leave the steering wheel 14*a*. Therefore, if it is determined that another vehicle 21 is detected, the processor 18 of the driving control device 1 determines that it is unlikely that a trailing other vehicle 22 will suddenly enter the planned lane-change zone Z2 from behind, and that lane-change control in the hands-off mode can be executed, thereby reducing the burden on the driver. On the other hand, since the first mode is a hands-on mode, if it is determined that another vehicle 21 has not been detected, the lane change is carried out in a state in which the driver can respond to unexpected situations in manual driving operations.

Figure 8:
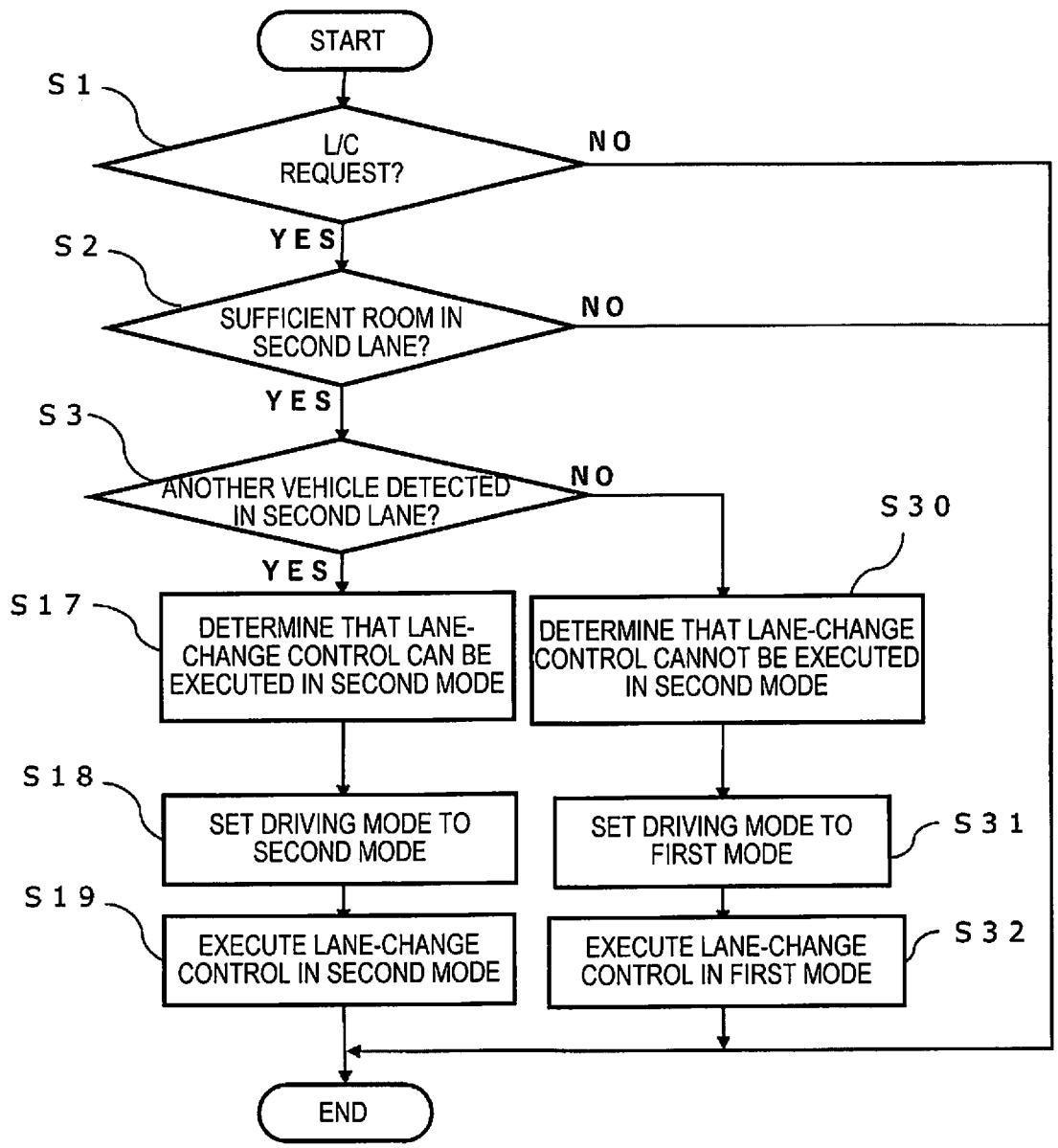
FIG. 8 is a flowchart illustrating the procedure of a driving control method carried out by a driving control device according to a fourth embodiment of the present invention.

In the present embodiment, Step S2 of FIG. 8 may be skipped, in the same manner as in the first embodiment. Further, between Steps S17 and S18, the processor 18 may output lane-change information to the output device 15 suggesting that lane-change control in the second mode can be executed and may execute a process by the input device 16 receives an instruction to execute the lane-change control in the second mode.

Further, in any of the first to the fourth embodiments, if the difference between the vehicle speed V0 of the host vehicle 10 and the vehicle speed V1 of the other vehicle 21 is greater than or equal to the prescribed speed difference dV, the processor 18 may execute a process to cancel the determination of Step S3 that "another vehicle has been detected traveling in the second lane 32." Similarly, in any of the first to the fourth embodiments, if the other vehicle 21 is traveling ahead of and is separated from the host vehicle 10 by at least the prescribed distance D0, the processor 18 may execute a process to cancel the determination of Step S3 that "another vehicle has been detected traveling in the second lane 32." Furthermore, in any of the first to the fourth embodiments, if the other vehicle 21 is a two-wheeled vehicle, the processor 18 may execute a process to cancel the determination of Step S3 that "another vehicle has been detected traveling in the second lane 32."

When the host vehicle 10 carries out a lane change to an adjacent-adjacent lane, the processor 18 determines whether another vehicle is detected within a prescribed detection zone, for both the adjacent lane and the adjacent-adjacent lane. If it is determined that another vehicle is detected within a prescribed detection zone in the adjacent lane and/or the adjacent-adjacent lane, the processor 18 determines that lane-change control to the adjacent-adjacent lane can be executed. On the other hand, if it is determined that another vehicle is not detected within a prescribed detection zone both in the adjacent lane and the adjacent-adjacent lane, the processor 18 determines that lane-change control to the adjacent-adjacent lane cannot be executed. Based on these determinations, the processor 18 outputs information to the output device 15 and/or the drive controller 17 regarding whether lane-change control can be executed. As a result, the processor 18 can execute lane-change control in those situations in which it is unlikely that a trailing other vehicle will suddenly enter the planned lane-change zone of the adjacent-adjacent lane from behind, and in which it is unlikely that a trailing other vehicle traveling in an adjacent lane at high speed will suddenly approach the host vehicle 10 during a lane change.

The invention claimed is:

1. A driving control method for executing a lane-change control for controlling a host vehicle to autonomously change lanes from a first lane to a second lane that is adjacent the first lane using a processor of a driving control device that controls vehicle speed and steering of the host vehicle traveling in the first lane in an autonomous driving mode, the driving control method comprising:
   the processor
   using a sensor mounted on the host vehicle to determine whether another vehicle is detected in the second lane within a prescribed detection zone and is positioned behind the host vehicle,
   determining that the lane-change control can be executed upon determining that the other vehicle has been detected within the prescribed detection zone and is positioned behind the host vehicle,
   determining that the lane-change control cannot be executed upon determining that no vehicle has been detected within the prescribed detection zone or upon determining that the other vehicle is not behind the host vehicle, and
   outputting lane change information that the lane-change control can be executed to move the host vehicle in front of the other vehicle based on the determination that the lane-change control can be executed,
   the processor being configured to execute the lane-change control to autonomously change lanes only upon determining that the other vehicle is in the prescribed detection zone and behind the host vehicle.

2. The driving control method according to claim 1, wherein
   the processor
   detects a vehicle speed of the other vehicle upon determining that the other vehicle has been detected within the prescribed detection zone,
   determines that the lane-change control can be executed upon determining the vehicle speed of the host vehicle is greater than or equal to the vehicle speed of the other vehicle, and
   outputs a command to the driving control device to control the vehicle speed such that the vehicle speed of the host vehicle becomes greater than or equal to the vehicle speed of the other vehicle.

3. The driving control method according to claim 1, wherein
   the processor
   detects the vehicle speed of the host vehicle and the vehicle speed of the other vehicle, and
   cancels a determination that the other vehicle has been detected upon determining the vehicle speed of the other vehicle is greater than the vehicle speed of the host vehicle and the difference between the vehicle speed of the other vehicle and the vehicle speed of the host vehicle is greater than or equal to a prescribed speed difference.

4. The driving control method according to claim 1, wherein
   the processor
   detects a relative position of the other vehicle with respect to the host vehicle, and
   cancels a determination that the other vehicle has been detected upon determining the other vehicle is traveling ahead of the host vehicle and a distance between the host vehicle and the other vehicle is greater than or equal to a prescribed distance in a direction of travel of the host vehicle.

5. The drive control method according to claim 1, wherein the processor cancels a determination that the other vehicle has been detected upon determining the other vehicle is a two-wheeled vehicle.

6. The driving control method according to claim 1, wherein
   the processor outputs the lane-change information to an output device suggesting that the lane-change control be executed upon determining the lane-change control can be executed, and
   the processor outputs a command to the driving control device to execute the lane-change control upon an instruction to execute the lane-change control being input to an input device based on the lane-change information.

7. The driving control method according to claim 1, wherein
   the processor outputs a command to the driving control device to execute the lane-change control upon determining the lane-change control can be executed.

8. The driving control method according to claim 1, wherein the processor outputs a command to the driving control device to prohibit execution of the lane-change control upon determining the other vehicle is not detected within the prescribed detection zone.

9. The driving control method according to claim 1, wherein
the processor can switch between a driving mode between a first mode, which requires visual monitoring of surrounding conditions of the host vehicle by a driver, and a second mode, which is the autonomous driving mode in which the processor executes the monitoring of the surrounding conditions of the host vehicle,
the processor determines that the lane-change control using the second mode can be executed upon determining that the other vehicle has been detected within the prescribed detection zone, and
the processor determines that the lane-change control using the second mode cannot be executed and sets the driving mode to the first mode upon determining that the other vehicle has not been detected within the prescribed detection zone.

10. The driving control method according to claim 9, wherein
the first mode is a hands-on mode in which steering control by the processor is inoperable when a driver of the host vehicle is not holding a steering wheel of the host vehicle, and
the second mode is a hands-off mode in which steering control by the processor is operable even if the driver's hands leave the steering wheel.

11. The driving control method according to claim 1, wherein
the processor
determines whether there is a required space in the second lane for the host vehicle to execute a lane change, and
outputs a command to the driving control device to prohibit execution of the lane-change control upon determining that the required space is not available.

12. A driving control device comprising:
a processor that controls a vehicle speed and a steering of a host vehicle traveling in a first lane in an autonomous driving mode to cause the host vehicle to autonomously change lanes from the first lane to a second lane that is adjacent the first lane, and
an other vehicle detection unit configured to detect other vehicles traveling in the second lane, wherein
the processor
determines whether another vehicle is detected traveling within a prescribed detection zone in the second lane and is positioned behind the host vehicle based on a detection result of the other vehicle detection unit,
determines that a lane-change control can be executed upon determining that the other vehicle has been detected within the prescribed detection zone and behind the host vehicle,
determines that execution of the lane-change control cannot be executed upon determining that no vehicle has been detected within the prescribed detection zone or that the other vehicle is not behind the host vehicle, and
outputs lane change information that the lane-change control can be executed to move the host vehicle in front of the other vehicle based on the determination that the lane-change control can be executed,
the processor being configured to execute the lane-change control to autonomously change lanes only upon determining that the other vehicle is in the prescribed detection zone and behind the host vehicle.

13. The driving control method according to claim 1, wherein
the processor outputs the lane-change information to an output device suggesting that the lane-change control using a first mode that can be executed upon determining the lane-change control can be executed while the host vehicle is traveling in a second mode.

14. The driving control method according to claim 1, wherein
prescribed detection zone is a region in which the processor is able to monitor the behavior of the other vehicle.

15. The driving control method according to claim 14, wherein
the region is in the second lane adjacent the host vehicle and extends forward and rearward of the host vehicle.

16. The driving control method according to claim 1, wherein
prescribed detection zone is a region in the second lane adjacent the host vehicle that extends forward and rearward of the host vehicle.

17. The driving control method according to claim 1, wherein
the processor controls the host vehicle to stay in the first lane without changing lanes upon determining that the lane-change control cannot be executed.

* * * * *